United States Patent [19]

Zucker

[11] 4,160,174

[45] Jul. 3, 1979

[54] POWER CAPACITOR MOUNTING AND INDICATOR LIGHT STRUCTURE

[76] Inventor: Myron Zucker, 708 W. Long Lake Rd., Bloomfield Hills, Mich. 48013

[21] Appl. No.: 745,797

[22] Filed: Nov. 29, 1976

[51] Int. Cl.² .......................................... A47B 51/00
[52] U.S. Cl. .............................. 307/328; 312/257 SK; 361/331; 361/390
[58] Field of Search .................. 307/149, 154, 328; 361/332, 333, 334, 343, 344, 347, 356, 357, 381, 390, 417, 418, 419, 331, 272, 275, 328; 337/4, 5, 241, 242, 266; 312/228, 293, 252 R, 252 SM, 252 A, 257 SK, 229, 245, 270, 107, 126, 283

[56] References Cited

U.S. PATENT DOCUMENTS

| | | | |
|---|---|---|---|
| 2,264,994 | 12/1941 | Marbury | 361/328 |
| 2,448,389 | 8/1948 | Powell | 337/242 |
| 2,467,377 | 4/1949 | Giegerich | 312/257 SK |
| 2,545,760 | 3/1951 | Blanchard | 340/250 |
| 2,660,694 | 11/1953 | Cuttino | 361/331 |
| 2,673,910 | 3/1954 | Alden | 337/242 |
| 2,855,483 | 10/1958 | Swing | 337/242 |
| 2,885,600 | 5/1959 | Wiseman | 361/390 |
| 3,534,229 | 10/1970 | Aungst | 361/331 |

Primary Examiner—L. T. Hix
Assistant Examiner—S. D. Schreyer
Attorney, Agent, or Firm—Whittemore, Hulbert & Belknap

[57] ABSTRACT

Structure for mounting power capacitors including indicator light structure for indicating the condition of one or more power capacitors and including a catch basin for retaining liquid from power capacitors mounted therein. In one modification, the indicator light structure prevents removal of the cover of the capacitor mounting structure without breaking the circuit through the capacitors. In another modification the indicator light structure is mounted on a hinged portion of the capacitor mounting structure whereby the capacitor mounting structure may be open for ease of inspection or repair.

13 Claims, 13 Drawing Figures

POWER CAPACITOR MOUNTING AND INDICATOR LIGHT STRUCTURE

BACKGROUND OF THE INVENTION

1. Field of the Invention

The invention relates to capacitor mounting structure and refers more specifically to such a structure including a catch basin therein constructed and arranged to retain fluid from capacitors mounted therein with the enclosure oriented in any of three mutually perpendicular directions, and indicator light means for indicating excess current drawn by a capacitor mounted in the structure.

2. Description of the Prior Art

In the past, power capacitor mounting structure has generally not been liquid tight so that liquid from capacitors mounted therein which may escape the capacitors due to leakage, spillage or damage of the capacitors has not been contained within the capacitor mounting structure. Such liquid is often irritative and may sometimes be poisonous, whereby the liquid may endanger personnel in the area of the capacitor mounting structure.

Further, prior capacitor mounting structures have usually not included means for readily detecting the condition of a capacitor mounted therein from the exterior of the capacitor mounting structure. Wherein capacitor indicating structure has been provided in the past, it has generally been either complicated or not readily informative to personnel on casual inspection of the capacitor mounting structure. Also, prior capacitor indicating structure has not included adequate interlocks to insure disconnecting the capacitor circuits prior to removal of the covers thereof and/or the circuits therefor have been inaccessible for inspection or repair.

SUMMARY OF THE INVENTION

In accordance with the invention, capacitor mounting structure is provided including a catch basin therein for retaining liquid from capacitors mounted in the capacitor mounting structure, with the capacitor mounting structure in any of three mutually perpendicular positions. The capacitor mounting structure of the invention also includes sponge material within the catch basin for absorbing the liquid from the capacitors.

Also, the capacitor mounting structure is constructed and arranged to permit entrance holes for incoming wires to be placed in any of the front, top, bottom, rear, right or left side thereof, and includes clear space for access into the interior of the enclosure from the front, top or side thereof, as desired, so that live terminals of a capacitor mounted in the capacitor mounting structure are inaccessible except for unmistakably recognizable terminal blocks.

Interlocks are included in the capacitor mounting structure of the invention to insure disconnection of power thereto when the cover of the capacitor mounting structure is removed therefrom, and to insure that power cannot be returned to the capacitor mounting structure prior to replacing the cover and properly positioning it. In one modification of the capacitor mounting structure, the cover cannot be removed without first disconnecting the power.

Further, in accordance with the invention, the capacitor mounting structure includes indicator light means connected between a source of electrical energy and capacitors mounted in the capacitor mounting structure including a fuse in series between at least some of the phases of the source of electrical energy and the power capacitors in parallel with a series connected light and resistance, whereby the light is energized on opening of the fuse in response to excessive current being drawn by the power capacitor.

The light, fuse and resistor may be included in a separate package which may be removed from the capacitor mounting structure without removal of any other portion of the structure. The separate package is mounted on the capacitor mounting structure so as to expose the light and permit removal of the fuse therefrom from the exterior of the capacitor mounting structure. In one modification, the indicator light means is mounted on a portion of the capacitor mounting structure which is hinged to expose the capacitor and indicator light means circuits for inspection and repair.

Separate indicator structure may be provided in conjunction with each of the phases of the power source for capacitors mounted in the capacitor mounting structure. Further, the capacitors mounted in the capacitor mounting structure may be divided into groups associated with separate indicator means whereby the indicator means may be more sensitive.

DESCRIPTION OF THE PREFERRED EMBODIMENTS

Figure 1:
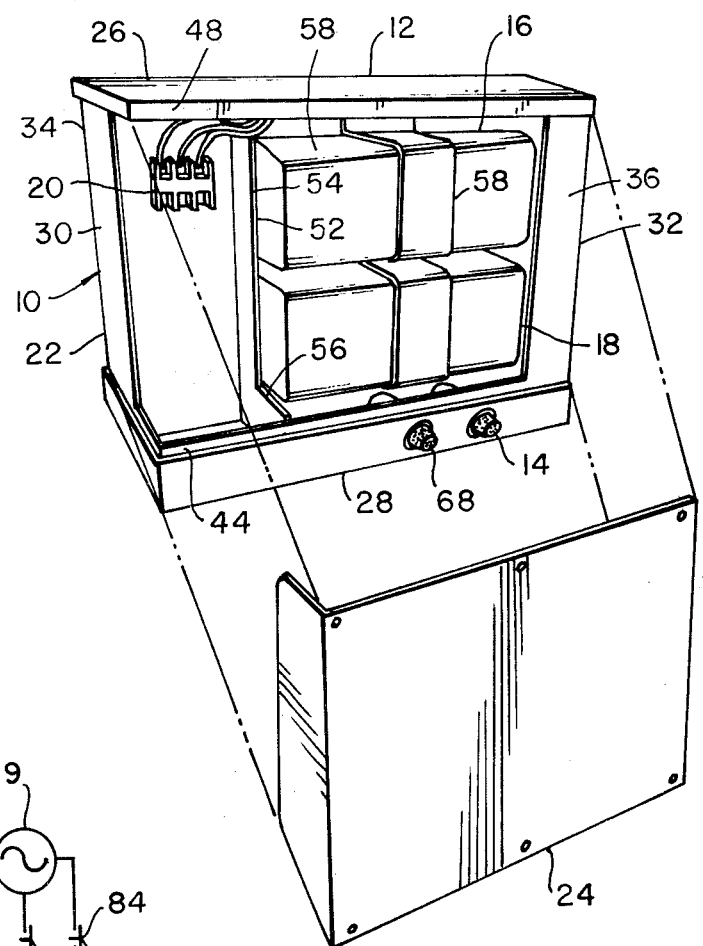
FIG. 1 is a perspective view of the capacitor mounting structure of the invention, showing the cover removed therefrom.

As shown best in FIG. 1, the power capacitor mounting structure 10 includes the enclosure 12 and the indicator means 14. The enclosure 12 is constructed to house a plurality of power capacitors 16 and 18 which are connected to lower terminals 17 and upper terminals 21 on terminal block 20 and indicator means 14, as shown best in FIGS. 2 and 4 through 6. A three-phase cable from energy source 19 to terminal block 20 may be passed into enclosure 12 through a convenient opening in enclosure 12, not shown. The indicator means 14 provides a visual indication that normal current drawn by capacitors 16 and 18 has been exceeded. The indicator means 14 also serves as an isolation switch for the associated capacitors 16 and 18.

Figure 2:
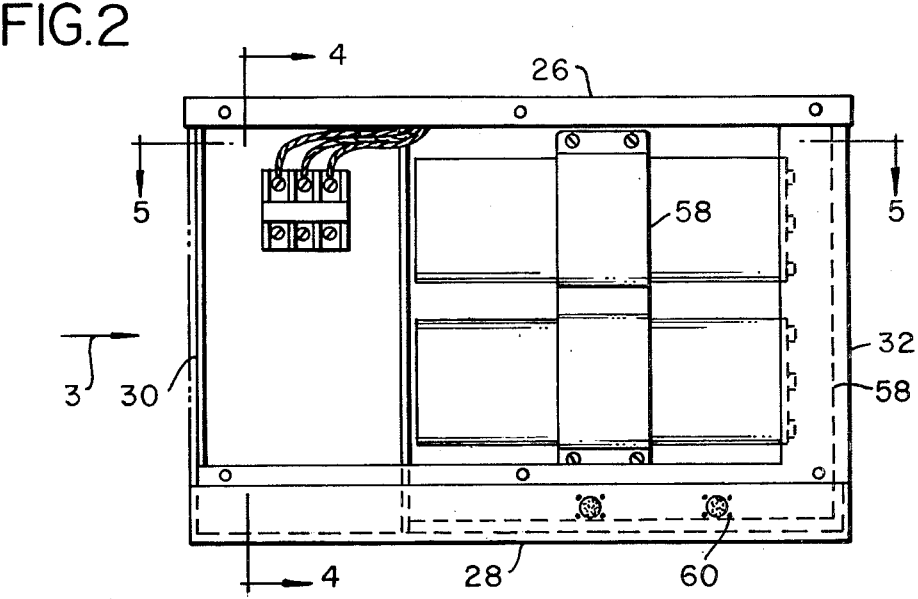
FIG. 2 is a front elevation view of the capacitor mounting structure of the invention of FIG. 1, with the cover shown in phantom.
Figure 3:
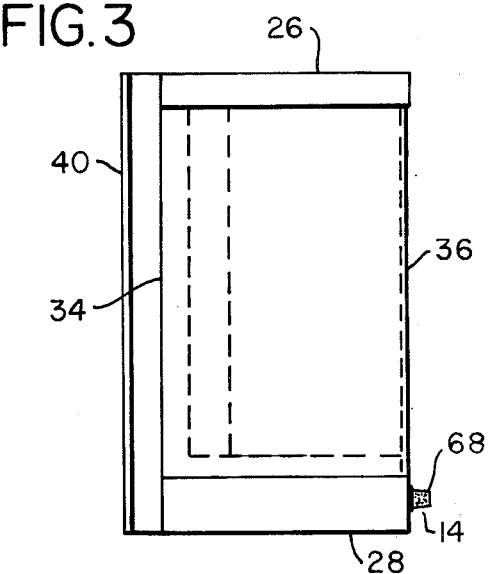
FIG. 3 is a side elevation view of the capacitor mounting structure illustrated in FIG. 2, taken in the direction of arrow 3.

More specifically, the enclosure 12 includes the tray 22 and cover 24. The tray 22 has a top 26, bottom 28, left and right sides 30 and 32, respectively, as shown in FIG. 2, a back 34 and a front 36. Flanges 38 are provided at each end of the back 34 to facilitate mounting of the tray 22 in three mutually perpendicular positions. Cooling fin structure 42 is also attached to the back 34 of the tray 22, as required, by convenient means, not shown, such as screws or welding.

Figure 4:
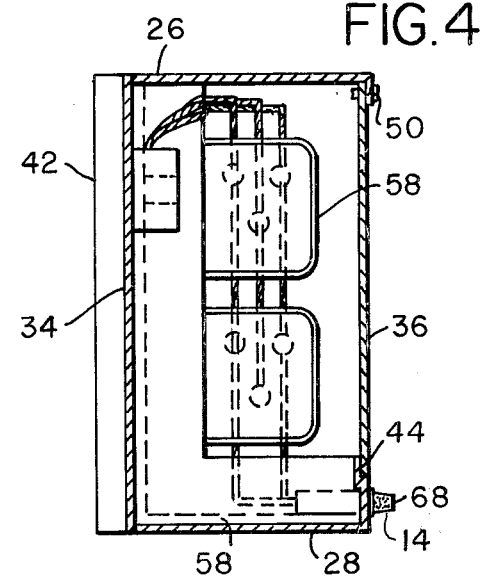
FIG. 4 is a section view of the capacitor mounting structure illustrated in FIG. 2, taken substantially on the line 4—4 in FIG. 2.

An offset lip 44, as best shown in FIG. 4, is provided on the front 36 and side 30 against which the bottom of the cover 24 is positioned. A downwardly extending flange 48 is provided on the top 26 adjacent the front 36 and on the side 30 of the tray 22 behind which the top of the cover 24 is fitted. The cover 24, as shown best in FIG. 1, when in place is secured over the lip 44 and behind the flange 48 by releasable means such as screws 50, shown best in FIG. 4. The cover 24 is a rigid L-shaped member, as best shown in FIG. 1.

A partial partition 52 including the separate portions 54 and 56 are secured within the tray 22 by watertight means such as welding to the top, back, bottom and front of the tray. It will be noted that the partition 52 with the tray 22 provides a catch basin within the tray 22 which is operable to retain fluid from capacitors 16 and 18 which may leak, spill or otherwise come therefrom as a result of an explosion or the like of the capacitors with the enclosure 12 mounted in any of three relatively perpendicular positions; that is, flat with the back 34 down, in an upright position with the bottom 28 down, and in a position with the side 36 down. Thus, possible harmful effects of the fluid on surrounding personnel and structure may be substantially eliminated.

Fluid may be further retained within the catch basin provided by the partition 52 in conjunction with tray 22 by placing sponge material 58 within the catch basin. The sponge material will thus soak up any undesirable fluid, which may then be removed from the capacitor mounting structure 10 on removal of the sponge material therefrom.

It will also be noted that the capacitor mounting structure 10 including the tray 22 and cover 24, as shown in FIGS. 1–5, permits construction of an entrance hole for incoming wires in either the top, front, rear, bottom, left side or right side of the enclosure. Further, as shown best in FIG. 1, the positioning of the capacitors 16 and 18 on the tray 22 provides easy access to the interior of the power capacitor structure for maintenance from the front and left side, and the dimensions of the structure are such that vertical movement within the enclosure is possible during maintenance. Also note that in accordance with the structure shown in FIG. 1, the live terminals within the power capacitor mounting structure 10 are inaccessible except for the unmistakably recognizable terminal block 20.

Figure 6:
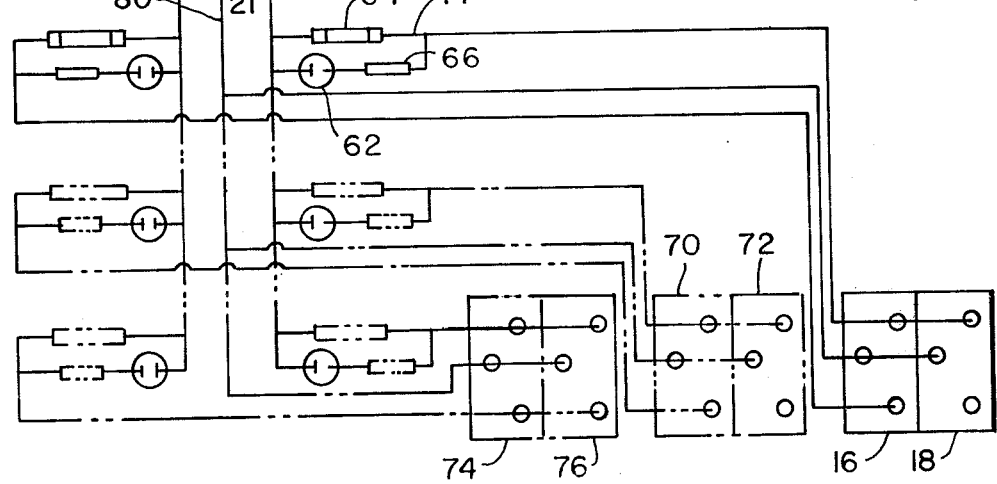
FIG. 6 is a partly schematic, partly diagrammatic view of the indicator light means of the circuit of the capacitor mounting structure illustrated in FIGS. 1–5, including indicator light means and additional capacitors and indicator light means shown in phantom.

As a modification of the power capacitor mounting structure 10, mechanical interlocks 84 may be provided in the electrical circuit shown in FIG. 6, which may be actuated by the cover 24 so that the interlocks will be open unless the cover 24 is in place in the correct position. Such safety interlocks may be located on the tray 22 adjacent the edges of the cover as desired for insuring proper location of the cover. The interlocks may include in one modification a microswitch and electrically operated contactor.

Figure 5:
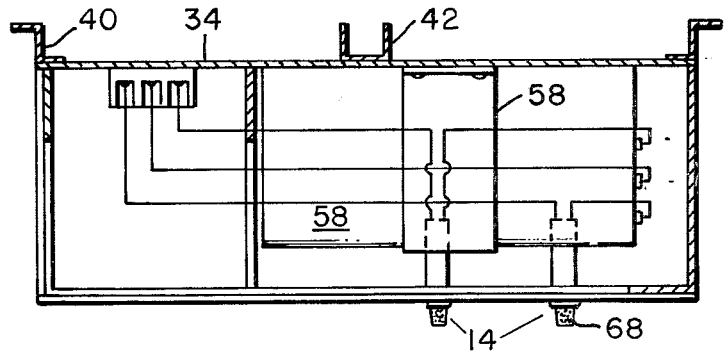
FIG. 5 is a section view of the capacitor mounting structure illustrated in FIG. 2, taken substantially in the direction of arrows 5—5 in FIG. 2.

As shown best in FIGS. 4 and 5, the capacitors 16 and 18 are secured to the tray by a conventional strap 58 which may itself be secured to the back 34 of the tray 22 by convenient releasable means such as bolts and nuts, with the capacitors positioned over the catch basin structure provided by the tray 22 and partition 52.

The indicator means 14, as shown, is secured in the front 36 of the tray 22 by convenient means such as bolts 60, as desired. Each indicator means 14 includes a separate indicator light 62, fuse 64, and resistor 66, connected as shown best in FIG. 6, with the fuse being in series with associated terminals of one or more capacitors and a phase of the source of power 19 through the terminal block 20. The indicator light and resistor are connected in series with each other across the fuse 64.

Thus, on opening of the fuse 64 due to excessive current between the associated phase of the power supply and terminal of the capacitors, the light 62 will be caused to light, giving an indication of the excess current being drawn by the associated capacitors.

As shown best in FIGS. 1–5, the indicator structure 14 is constructed so that it can be removed from the front 36 of the capacitor mounting structure without disconnecting any other portion of the assembly. Further, the lens 68 of the indicator structure 14 may be removed by unscrewing it and the fuse removed and replaced through the lens 68. Thus, the indicator structure 14 also serves as an isolation switch for the associated phase of the power supply and terminal of the capacitors mounted in the capacitor mounting structure.

The circuit diagram of FIG. 6 will be considered in conjunction with the operation of the indicator means 14. Thus, under normal operating conditions, with three phases of a source of power being passed to the group of capacitor cells 16 and 18, and possible additional groups of capacitors 70 and 72, and 74 and 76, through terminal block 20, over conductors 78, 80 and 82, and with a separate fuse 64, light 62 and resistor 66, connected as shown in each of two of the phases of each group of capacitors, should excessive current be drawn through any of the capacitors 16, 18, 70, 72, 74 or 76, one of the fuses 64 will open and the associated light 62 will go on to provide from the outside of the capacitor mounting structure 10 an indication of the excessive current in the capacitor so that corrective action can be taken at an early stage before temperatures and pressures build up in the capacitor which might cause damage to the capacitor mounting structure and to the other capacitors within the structure.

It will be understood that other groupings of capacitors may be provided and that separate indicator structure may be provided for each phase of single-phase or multiple-phase electrical systems.

The grouping together of capacitors into small groups where multiple capacitors are utilized permits a lower value fuse to be used in conjunction with the smaller group, whereby the sensitivity of the fuse is increased.

In use, if it is desired to isolate a capacitor assembly or a particular portion thereof from the power supply, it is merely necessary to remove the lens 68 from the associated indicator means 14 and remove the fuse therefrom. Accidents from accidentally closed switches during repair and the like may thus be prevented. Further, it will be noted that with the indicator means 14 secured to the tray itself that the cover may be readily removed.

Figure 7:
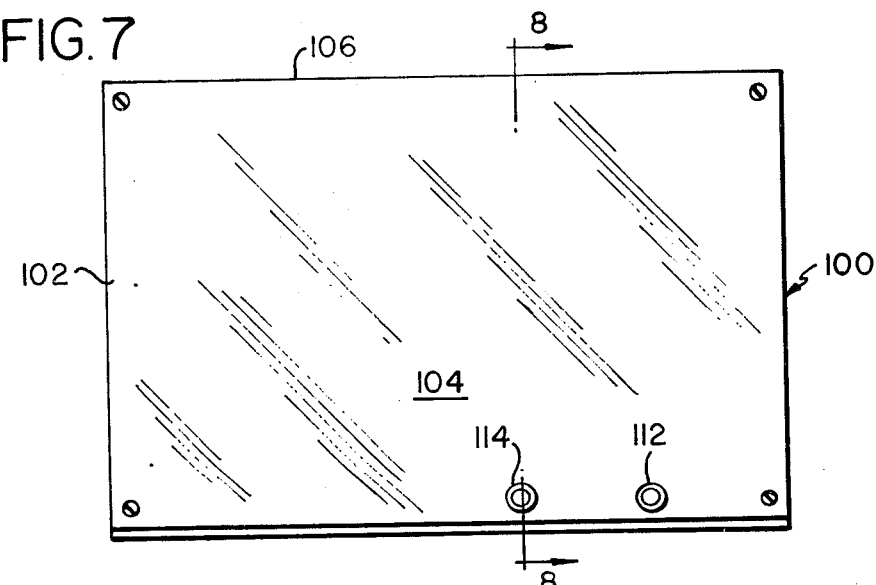
FIG. 7 is a front view of a first modification of the capacitor mounting structure illustrated in FIGS. 1–6.
Figure 8:
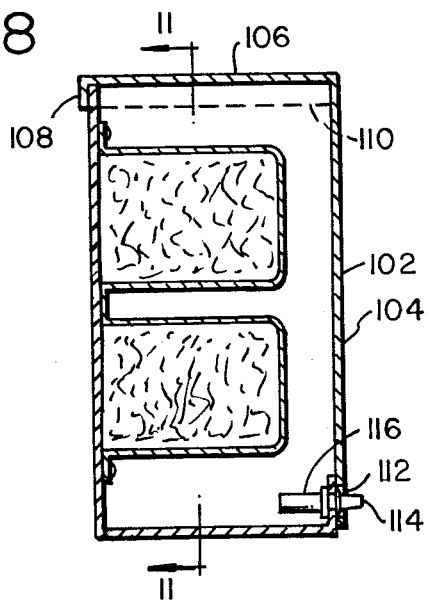
FIG. 8 is a section view of the capacitor mounting structure illustrated in FIG. 7, taken substantially on the line 8—8 in FIG. 7.
Figure 9:
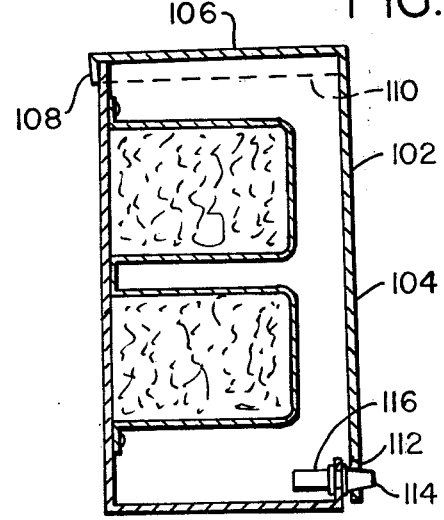
FIG. 9 is a view similar to the view of FIG. 8 illustrating the cover of the capacitor mounting structure in a partly removed position.
Figure 11:
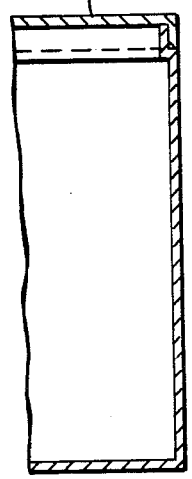
FIG. 11 is a partial section view of the capacitor mounting structure illustrated in FIGS. 7–10, taken substantially on the line 11—11, FIG. 8.
Figure 10:
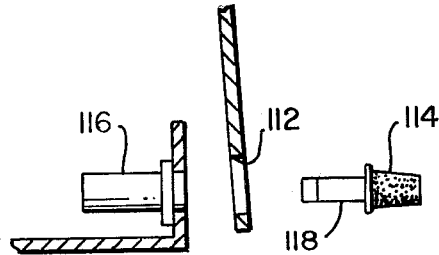
FIG. 10 is an enlarged partial view of one corner of the capacitor mounting structure as illustrated in FIGS. 8 and 9 showing the indicator light lens and fuse removed therefrom.

In the capacitor mounting structure 100 illustrated in FIG. 7, the cover 102 includes the front panel 104 which extends over substantially the entire front of the capacitor mounting structure and the top 106 constructed integrally therewith, including the rear flange 108 and side flanges 110. The cover 102 further includes openings 112 therein positioned over the lenses 114 of the indicator light means 116. The indicator light lenses 114 extend outwardly from the front panel 104 of the cover 102 and are dimensioned with respect thereto and the opening 112 therethrough so that it is impossible to remove cover 102 without first removing the indicator light lenses 114. As shown best in FIG. 10, the fuses 118 are secured to the lenses 114, whereby on removal of a lense a fuse 118 is removed therewith. With such modification, it would be impossible to remove the cover 102 from the capacitor supporting structure without first removing the fuses 118 therefrom as a safety measure.

Figure 12:
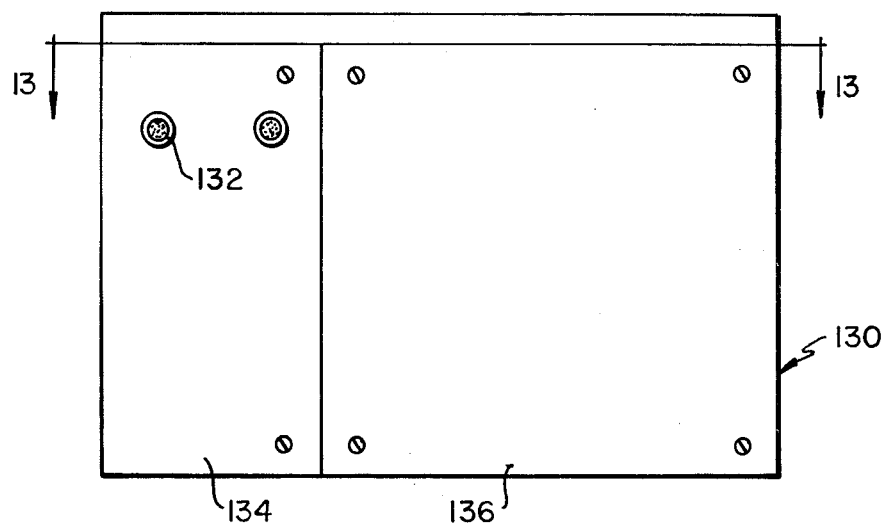
FIG. 12 is a front view of a second modification of the capacitor mounting structure illustrated in FIGS. 1–6, showing the portion of the cover of the capacitor mounting structure mounting the indicator light means pivotally secured to the rest of the capacitor mounting structure and in a closed position.
Figure 13:
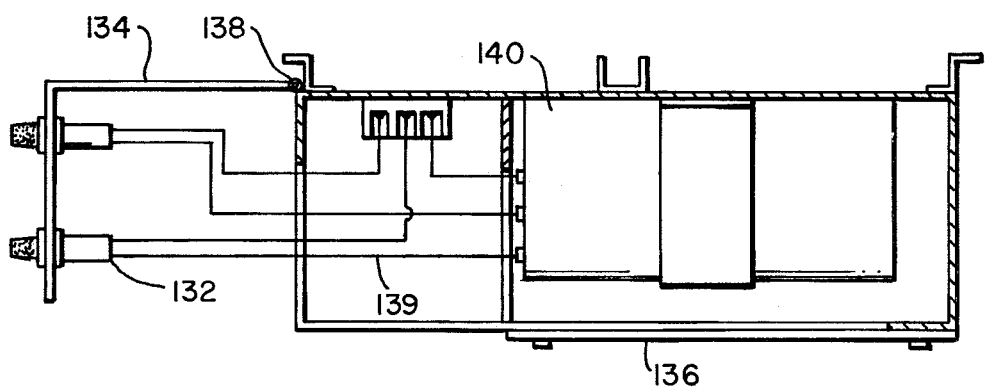
FIG. 13 is a section view of the capacitor mounting structure illustrated in FIG. 12, taken substantially on the line 13—13 in FIG. 10, with the portion of the cover of the capacitor mounting structure mounting the indicator light means in an open position.

In the modified mounting structure 130 illustrated in FIG. 12, the indicator light means 132 are supported on a portion 134 of the cover 136 which is hingedly mounted at 138. Thus, in use the indicator light means 132 and the electrical circuit 139 may be exposed on pivoting of the portion 134 into the open position as shown in FIG. 13. With the indicator light means 132 and circuit 139 so exposed, inspection and maintenance thereof may be readily accomplished.

As shown in the modified capacitor mounting structure 130, the connections are made to the capacitors 140 at the opposite ends thereof and the top of the cover is not split and a portion thereof pivoted with the portion 134 of the cover 136. If desired, it will be readily understood that a portion of the cover may also be pivoted and that the connection to the capacitors can be made at the opposite end thereof as desired.

While one embodiment and modifications thereof have been considered in detail, it will be understood that other embodiments and modifications of the invention are contemplated. For example, the invention with little modification can be utilized for large, substation type capacitors as well as for unit cell construction. It is the intention to include all such embodiments and modifications of the invention as are defined by the appended claims within the scope of the invention.

What I claim as my invention is:

1. Capacitor mounting structure including an enclosure for at least one power capacitor, means for connecting an input electrical signal to the capacitor and for withdrawing an output electrical signal from the capacitor, and a catch basin within the enclosure for retaining liquid coming from the capacitor within the enclosure with the enclosure mounted in any of three mutually perpendicular positions.

2. Structure as set forth in claim 1 and further including sponge material within the catch basin whereby liquid in the catch basin is soaked up by the sponge material and may be removed by removal of the sponge material from the enclosure.

3. Structure as set forth in claim 1, wherein the enclosure is constructed and arranged so that incoming electrical connections may be placed in either the top, front, rear, bottom, left or right sides of the enclosure, space is provided for easy access into the enclosure from the front, top or side thereof and live terminals of capacitors placed within the enclosure are inaccessible axcept for unmistakably recognizable terminal blocks.

4. Structure as set forth in claim 1, wherein the enclosure includes a tray and a cover for the tray and further including interlock structure for isolating the input electrical signal when the cover is removed from the tray.

5. Capacitor mounting structure comprising an enclosure including a tray, and a cover having a hole therein, a light including a lens and means for lighting the light including a fuse connected in parallel with the light secured to the lens for removal therewith, which light and means for lighting the light are secured to the tray with the lens extending through the hole in the cover a distance sufficient to prevent pivoted removal of the cover without first removal of the lens and fuse.

6. Structure as set forth in claim 1, wherein the enclosure has a back, front, top, bottom and at least one end and the catch basin includes the lower portion and one end of the back and front of the enclosure, the one end of the top and bottom of the enclosure, the one end of the enclosure and a partition extending between the lower portion of the front and back of the enclosure and in engagement with the bottom of the enclosure in spaced relation to the one end of the enclosure.

7. Structure as set forth in claim 6, wherein the catch basin further includes a partition within the enclosure extending from the bottom to the top of the enclosure and in engagement with the back of the enclosure in spaced relation to the one end of the enclosure.

8. Capacitor mounting structure including an enclosure for at least one capacitor, means for connecting an input electrical signal to the capacitor and for withdrawing an output electrical signal from the capacitor, and a catch basin within the enclosure for retaining fluid coming from the capacitor within the enclosure with the enclosure mounted in either of two mutually perpendicular positions.

9. Capacitor mounting structure comprising an enclosure including a tray and a cover, at least one capacitor mounted in the enclosure, an indicator light mounted on the enclosure, and means connected to the indicator light and capacitor for lighting the indicator light in response to a predetermined level of an operating parameter of the capacitor mounted in the enclosure, the light and means for lighting the light being secured to the tray, a lens positioned over the light, and the means for lighting the light including a fuse connected in parallel with the light, said fuse being secured to the lens for removal therewith and the lens being positioned with respect to one edge of the cover to prevent removal of the cover by pivoting of the cover without removal of the lens and fuse.

10. Capacitor mounting structure as set forth in claim 9 wherein a plurality of capacitors are mounted in the enclosure, a plurality of indicator lights are associated with the capacitors mounted in the enclosure, and separate means are connected to the indicator lights and capacitors for lighting an indicator light in response to a predetermined level of an operating parameter of an associated capacitor mounted in the enclosure, wherein conductors between the lights and means for lighting the lights are spaced as widely as feasible within the enclosure and the wiring for each phase of a capacitor connected to a light is of approximately the same length.

11. Capacitor mounting structure comprising an enclosure including a tray, and a cover having a hole in one edge thereof, a light including a lens and means for lighting the light, which light and means for lighting the light are secured to the tray with the lens extending through the hole in the one edge of the cover to prevent pivoted removal of the cover without first removal of the lens.

12. Capacitor mounting structure comprising an enclosure including a tray and a cover, at least one capacitor mounted in the enclosure, an indicator light mounted on the enclosure, and means connected to the indicator light and capacitor for lighting the indicator light in response to a predetermined level of an operating parameter of the capacitor mounted in the enclosure, the light and means for lighting the light being secured to the tray, a lens positioned over the light, said lens being positioned with respect to one edge of the cover to prevent removal of the cover by pivoting of the cover about one edge thereof without removal of the lens.

13. Capacitor mounting structure comprising an enclosure including a tray and a cover therefor, a light including a lens and means for lighting the light including a fuse connected in parallel with the light secured to the lens for removal therewith, which light and means for lighting the light are related to the tray so as to prevent pivoted removal of the cover without first removal of the lense and fuse.

* * * * *